US008257669B2

(12) United States Patent
Jankowski (10) Patent No.: US 8,257,669 B2
(45) Date of Patent: Sep. 4, 2012

(54) MULTI-TUBE CHEMICAL REACTOR WITH TESSELLATED HEAT TRANSFER FINS

(75) Inventor: Paul E. Jankowski, Goodrich, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/975,814

(22) Filed: Dec. 22, 2010

(65) Prior Publication Data

US 2011/0268631 A1    Nov. 3, 2011

(51) Int. Cl.
*B01J 8/00*     (2006.01)
*B01J 8/06*     (2006.01)
*B01J 10/00*    (2006.01)

(52) U.S. Cl. ........ 422/652; 422/625; 422/650; 422/651; 422/653; 422/659; 422/200; 422/201

(58) Field of Classification Search .................. 422/625, 422/650, 651, 652, 653, 659, 201, 200; 29/890.046
See application file for complete search history.

(56) References Cited

U.S. PATENT DOCUMENTS 1,920,800 A * 8/1933 McCausland ................. 165/160
6,623,719 B2 * 9/2003 Lomax et al. ................. 423/652

* cited by examiner

*Primary Examiner* — Walter D Griffin
*Assistant Examiner* — Lessanework Seifu
(74) *Attorney, Agent, or Firm* — James M. Chan (57) ABSTRACT

A chemical reactor is provided that includes:
  a plurality of tubes having a catalytic reactor substrate therein, each of the tubes having an inlet at one end for receiving a fluid flow and an outlet at an opposing end for discharging fluid flow, and a longitudinal axis parallel to the direction of fluid flow through the tube, the longitudinal axis of each tube being parallel to one another; and
  a plurality of heat exchange fins disposed on and extending radially from the exterior surface of each tube;
  the heat exchange fins on each tube independently having a profile along a cross-section perpendicular to the longitudinal axis of each tube, and the tubes being arranged with respect to one another, such that the heat exchange fin profiles together form a tessellated pattern in a plane that is perpendicular to the longitudinal axes of the tubes.

8 Claims, 8 Drawing Sheets

MULTI-TUBE CHEMICAL REACTOR WITH TESSELLATED HEAT TRANSFER FINS

STATEMENT REGARDING FEDERALLY SPONSORED RESEARCH OR DEVELOPMENT

This invention was made with Government support under contract DE-FC36-04GO14319. The Government has certain rights in the invention.

BACKGROUND OF THE INVENTION

Tubular reactors are often used for carrying out reactions involving fluid components, such as reforming hydrocarbon fuel. Hydrocarbon fuel reformers such as diesel fuel reformers can be used in various applications, including providing a hydrogen and carbon monoxide reformate that can be used as fuel for a solid oxide fuel cell. These reactors typically include a catalyst monolith disposed inside a tube, through which fuel flows. The catalyst catalyzes a reaction of the hydrocarbon fuel to convert it into hydrogen and carbon monoxide.

One important requirement for reactors such as hydrocarbon fuel reformers is to provide adequate heat transfer into the catalyst to maintain endothermic reaction conditions. Multiple techniques and concepts may be utilized to provide the required thermal conditions. As an example, reducing the diameter of a catalyst while maintaining its length both reduces the catalyst mass and therefore its heat capacity, and also reduces the heat transfer path. This approach, however, requires the use of multiple catalyst segments to maintain total catalyst volume and the resultant space velocity at a given flow rate. When such a strategy is utilized, the system must therefore be engineered to create uniform space velocities among all of the catalyst segments. Another technique to promote heat transfer is to increase the surface area separating the two fluids across which the heat transfer occurs. In practice, this is typically accomplished by incorporating heat transfer fins that are intimately attached to the catalyst tube(s) that project into the hot fluid flow path.

Figure 1:
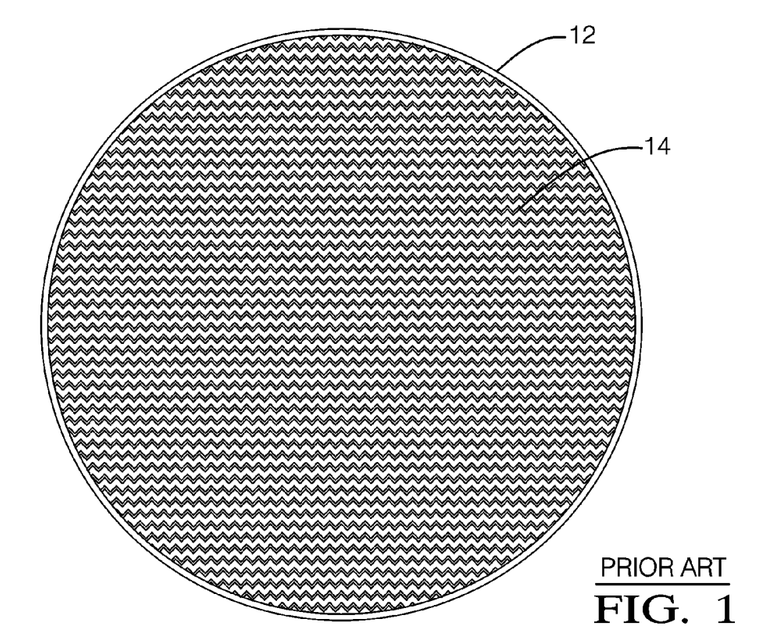
FIG. 1 depicts an end view of a prior art configuration having heat transfer fins or foil in a housing.
Figure 2:
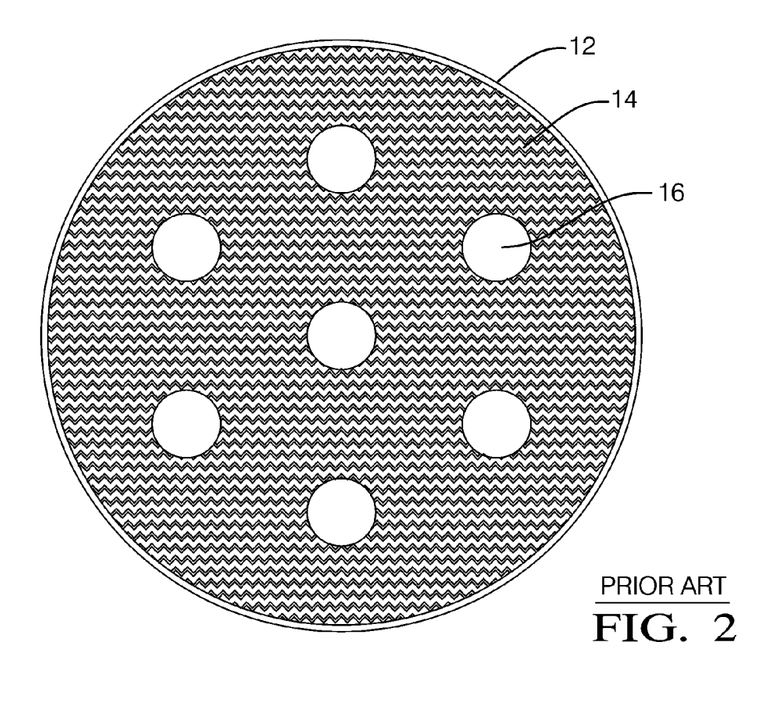
FIG. 2 depicts an end view of a prior art configuration having holes formed in the heat transfer fins or foil of FIG. 1.
Figure 3:
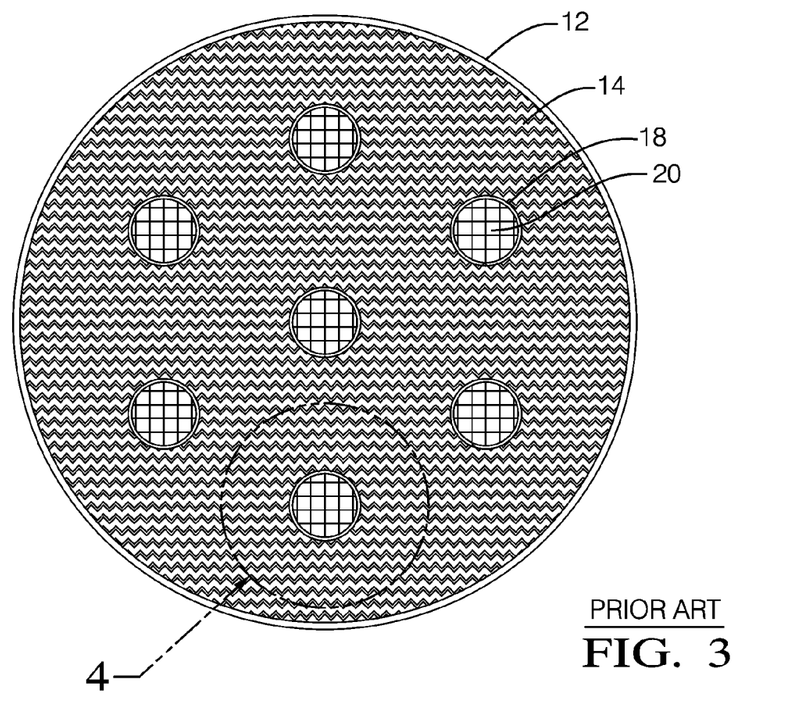
FIG. 3 depicts an end view of a prior art configuration having catalytic reactor tubes disposed in the holes of the structure of FIG. 2.

In order to exercise a high degree of control over the respective orientations of the tubes in a multi-tube reactor, a typical manufacturing approach is illustrated in FIGS. 1-4. The first step in this approach, as shown in FIG. 1, is the provision of a housing 12 having a number of fins or foils 14 disposed therein. Next, as shown in FIG. 2, a series of holes 16 are formed in the fins or foils 14 in a configuration to provide the desired distribution of fluid velocity and thermal kinetics. These holes may be formed by any of a number of known techniques, such as electronic discharge machining (EDM), laser machining, or mechanical boring. Then, as shown in FIG. 3, tubes 18 having catalyst monoliths 20 disposed therein are inserted into each of the holes 16, and fixed in place with adhesive or metal brazing.

Figure 4:
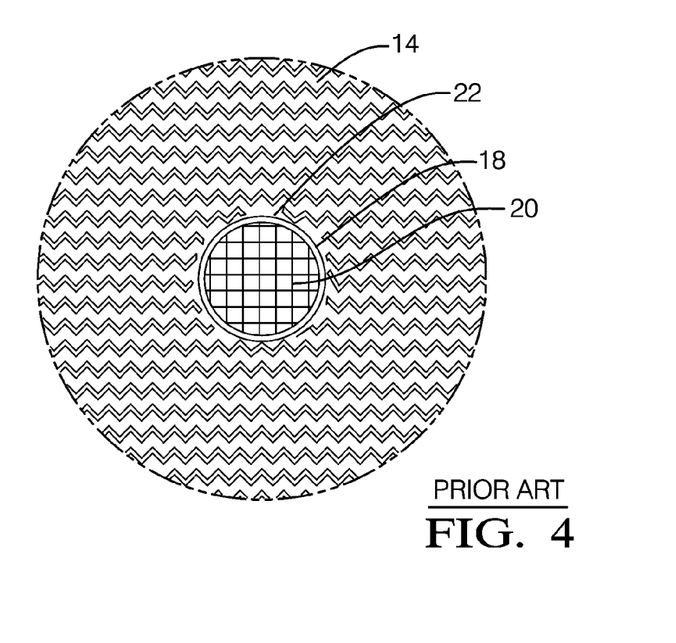
FIG. 4 depicts an end view of a magnified view of one of the catalytic reactor tubes from FIG. 3 disposed in a surrounding heat transfer fin or foil.

This prior art process, however, is subject to several problems. The forming of the holes 16 through the relatively delicate (typically about 0.04 mm thick) fins or foils 14 using conventional techniques such as EDM can be a time-consuming and expensive process. Additionally, insertion of the tubes 18 into the holes 16 subjects the foil along the periphery of the hole to damage and/or distortion because of the fine gauge of the foil. This can lead to small gaps 22 between the outside edge of the tube 18 and the foil 14, as shown in FIG. 4 (gaps may be exaggerated for purposes of illustration), which reduces the effectiveness of the heat transfer between the warmer fluid in the area of the foil matrix 14 and the colder fluid within the volume of the catalyst monolith 20.

Accordingly, there is a need for a more effective multi-tube reactor design and manufacturing method that is less susceptible to the above-described problems.

SUMMARY OF THE INVENTION

According to an exemplary embodiment of the present invention, a chemical reactor is provided comprising:
a plurality of tubes comprising a catalytic reactor substrate therein, each of the tubes having an inlet at one end for receiving a fluid flow and an outlet at an opposing end for discharging fluid flow, and a longitudinal axis parallel to the direction of fluid flow through the tube, the longitudinal axis of each tube being parallel to one another; and
a plurality of heat exchange fins disposed on and extending radially from the exterior surface of each tube;
the heat exchange fins on each tube independently having a profile along a cross-section perpendicular to the longitudinal axis of said each tube, and the tubes being arranged with respect to one another, such that the heat exchange fin profiles together form a tessellated pattern in a plane that is perpendicular to the longitudinal axes of the tubes.

According to another exemplary embodiment of the invention, a method of manufacturing a chemical reactor, comprising the steps of:
(a) providing a plurality of tubes, each tube defining a longitudinal axis;
(b) affixing heat exchange fins to each of said plurality of tubes, the fins on each tube independently having a predetermined profile along a cross-section perpendicular to the longitudinal axis of said tube;
(c) disposing a catalytic reactor substrate inside of each tube;
(d) arranging the tubes parallel to one another, such that the heat exchange fin profiles together form a tessellated pattern in a plane that is perpendicular to the longitudinal axes of the tubes; and
(e) securing the tubes to maintain their positions with respect to one another.

The multi-tube reactors according to these exemplary embodiments provides good contact between reactor tube and the heat transfer fins or foils and also avoids the need for expensive and time-consuming hole forming techniques such as EDM. These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring further below to the Figures, the invention will be described with reference to specific embodiments, without limiting same.

Figure 5:
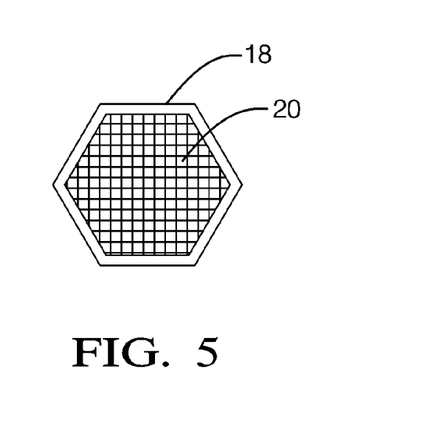
FIG. 5 depicts an end view of a hexagonal catalytic reactor tube.

Turning now to FIG. 5, an end view of a single hexagonal reactor tube 18 is shown having a catalyst monolith 20 disposed therein. Such catalyst monoliths are well-known in the art, and typically have a porous ceramic substrate or an oxidized metallic substrate that has been coated with a catalyst-containing washcoat. Of course, it is not essential that the reactor tube 18 begin with a catalyst disposed therein, as the catalyst monolith 20 can be inserted into the reactor tube 18 at any later stage of the manufacturing process, such as after placement of the heat transfer fins or foil or even final assembly of the multi-tube reactor device. In some exemplary embodiments, it may be desirable to place the catalyst monolith inside the tube later in the manufacturing process to avoid subjecting it to potential damage during implementation of the other manufacturing steps (e.g., brazing).

Figure 6:
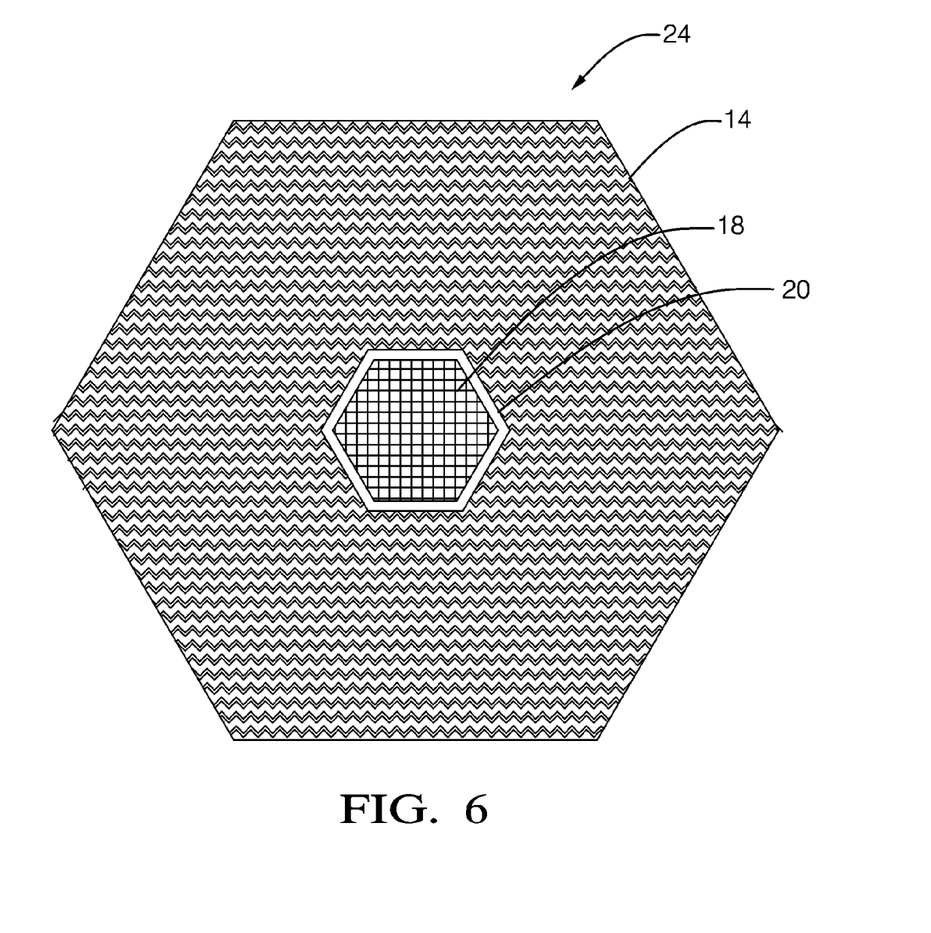
FIG. 6 depicts an end view of a heat transfer fin or foil stock disposed around the reactor tube of FIG. 5.

FIG. 6 shows an end view of a catalyst monolith-containing reactor tube 18 as shown in FIG. 5, which has had heat transfer foils 14 wrapped around it to form heat transfer reactor assembly 24. The heat transfer foils 14 have a substantially uniform thickness (as measured from the outer surface of reactor tube 18) so that the hexagonal shape of reactor tube 18 is carried through to the outer surface of heat transfer foils 14, which therefore also have a hexagonal outer shape as viewed from the end of the reactor tube 18. The heat transfer foils 14 may be affixed to the reactor tube by heat transfer foil winding techniques that are well-known in the art. In one exemplary embodiment, the foil material (e.g., in a reel or coil cut or shaped to match the shape of the reactor tube is affixed) to the reactor tube (also known in the heat transfer art as a core) and then wound around the reactor tube. The number and configuration of the foils may be based upon cell geometry and allocated process time, as known in the art. If a shaped foil such as a foil having a shape such as a sinusoidal wave pattern is used, a flat may be wound along with and interspersed with the shaped foil to help avoid nesting of adjacent rows of shaped foil that could result in corrupted cell densities, poor dimensional control, delamination between layers, and disruptions to the heat exchange fluid flow path.

The foil(s) to be wound may be affixed to the core using any of a number of known methods. For example, the foil may be spot-welded, pinched/constrained by a wire or other mechanical affixing means (which may be later removed), restrained magnetically, and other known methods. Once the foil is initially affixed, it may be wound or wrapped around the core either by rotating the core or by moving the foil circumferentially around the core (holding the core stationary) while gradually adjusting the respective position of the foil along the core's longitudinal axis to dispose the foil in helically wound rows along the longitudinal axis of the core. Foil tension should be maintained during the wrapping/winding process in order to achieve good contact between the foil and the core without deforming the foil and thereby altering the targeted final cell density.

Depending on the expected severity of the conditions on the exterior of the reactor tube 18 (e.g., flow velocity, temperature), the foil may be maintained in position on and in thermal contact with the reactor tube simply by the tension that was maintained on the foil during the winding/wrapping process. However, in some exemplary embodiments, further affixing techniques such as brazing may be used. If brazing is used, the brazing materials (e.g., a brazing paste) may be applied along the edge of the foil that will interface with the core while discharging the foil(s) from the reel before winding onto the core.

In one exemplary embodiment, the catalytic substrate 20 is disposed into the reactor tube 18 after the heat transfer foils or fins 14 are affixed to the outside of the reactor tube 18. In another exemplary embodiment, the ends of the tube 18 are not covered with heat transfer fins, which can allow for the tubes to extend beyond the end of a heat exchanger housing in which the tube 18 will ultimately be disposed.

Figure 7:
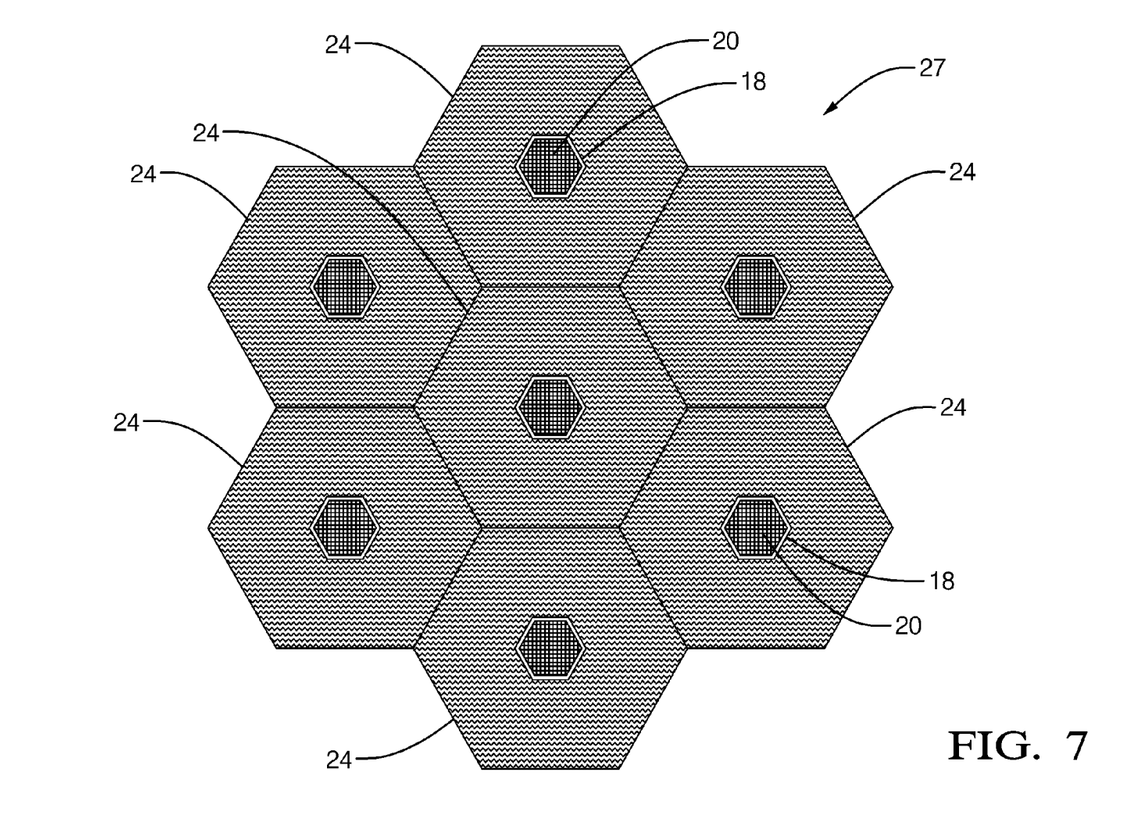
FIG. 7 depicts an end view of a group of seven of the structures from FIG. 6 formed in a tessellated pattern.
Figure 8:
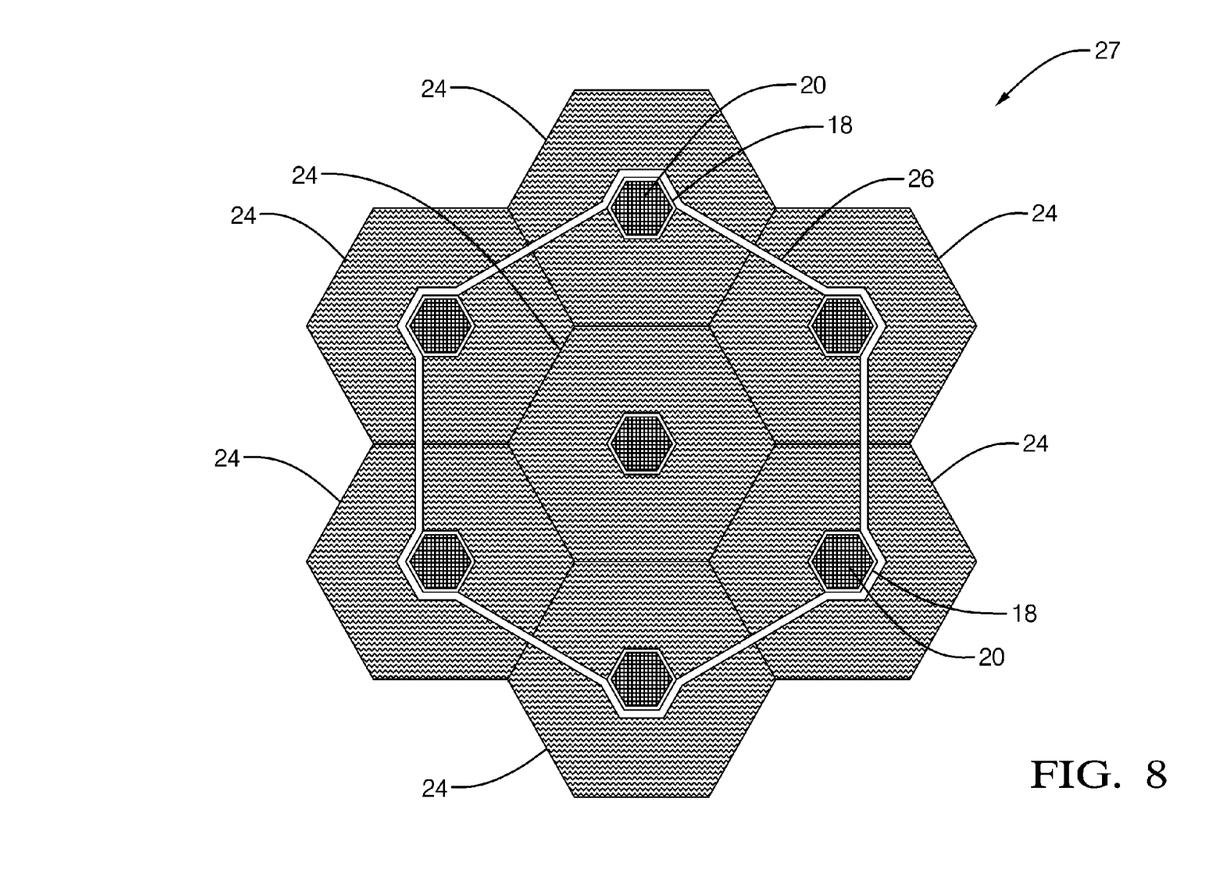
FIG. 8 depicts the structure of FIG. 7 where the multiple structures are secured together.
Figure 9:
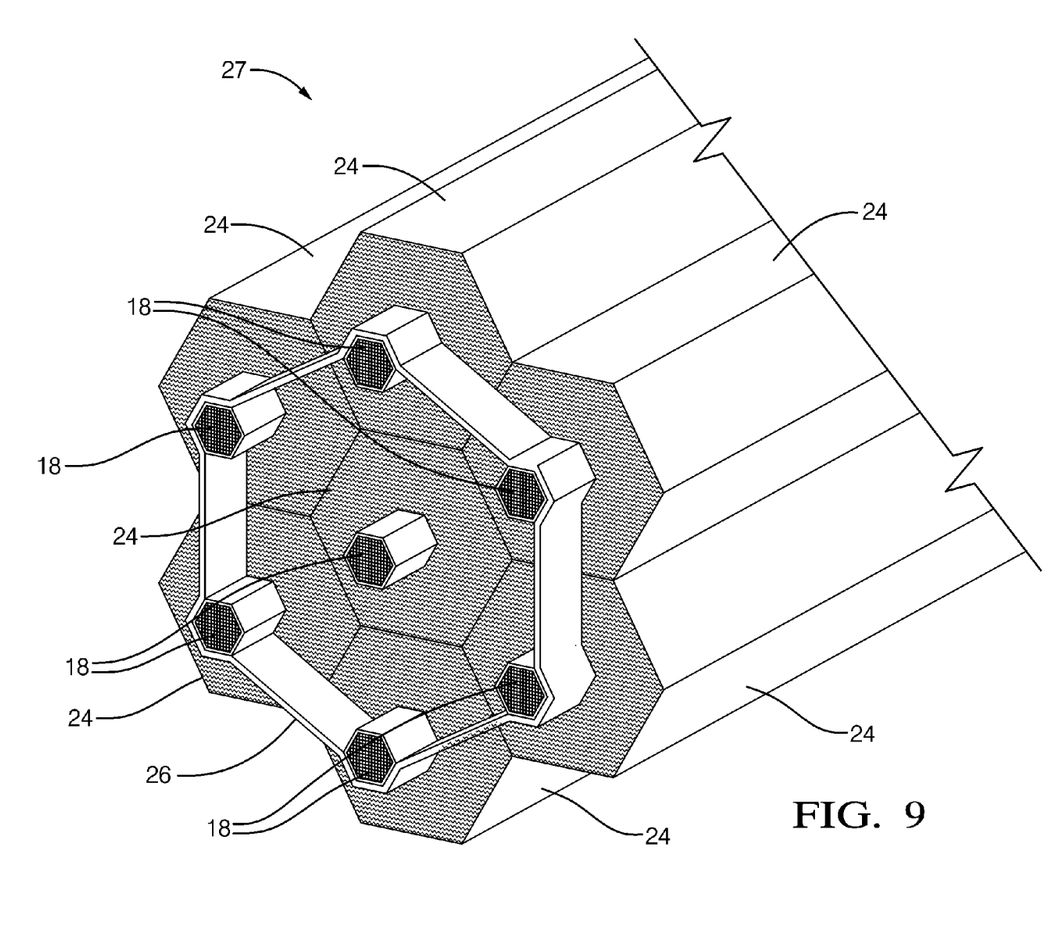
FIG. 9 depicts a perspective view of the structure of FIG. 8.

After the heat transfer foils or fins 14 are affixed to the reactor tube 18, seven of the hexagonal-shaped heat transfer reactor assemblies 24 are shown arranged together in a tessellated fashion to form multi-tube assembly 27, as shown in FIG. 7. By "tessellated fashion", it is meant that the cross-sectional footprints of the reactor assemblies 24 in a plane perpendicular to the longitudinal axes of the parallel tubes 18 will together fill a substantially contiguous area in that plane with no overlaps or gaps between the footprints of the individual reactor assemblies 24. Of course, the number of assemblies is not limited to seven, as the tessellated hexagonal (i.e., honeycomb) pattern can be continued indefinitely to form a variety of sizes and/or shapes of different configurations of tessellated reactor assemblies 24, as desired. After the heat transfer reactor assemblies 24 have been arranged together as exemplified in FIG. 7, they may be fixed together by a collar or band 26 around the ends of tubes 18 on each end of assembly 27, as shown in FIGS. 8 and 9. The band or collar 26 may be made of any suitable material (e.g., steel, high temperature silicone rubber) that can withstand the conditions to which the heat exchange reactor will be subjected. In one exemplary embodiment, the band or collar is made of steel that is welded or brazed to the ends of tubes 18.

Figure 10:
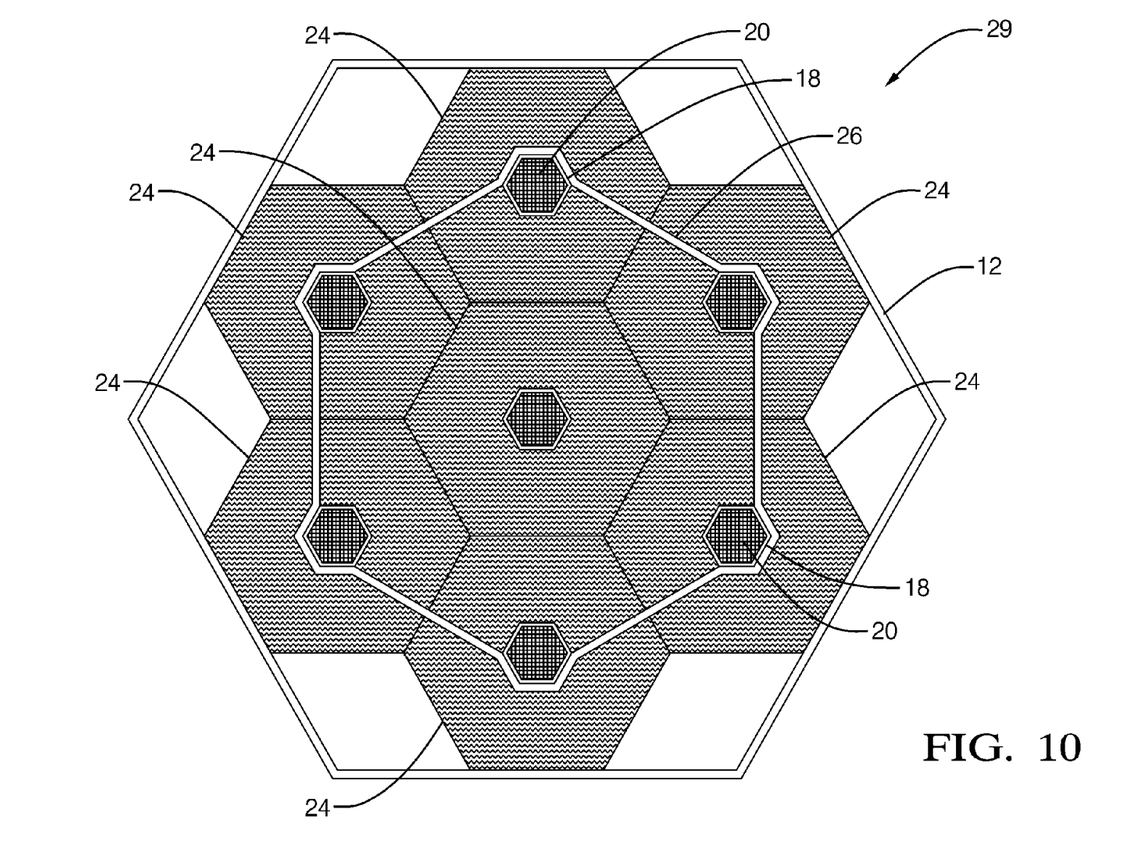
FIG. 10 depicts the structure of FIG. 8 disposed in an external housing.
Figure 11:
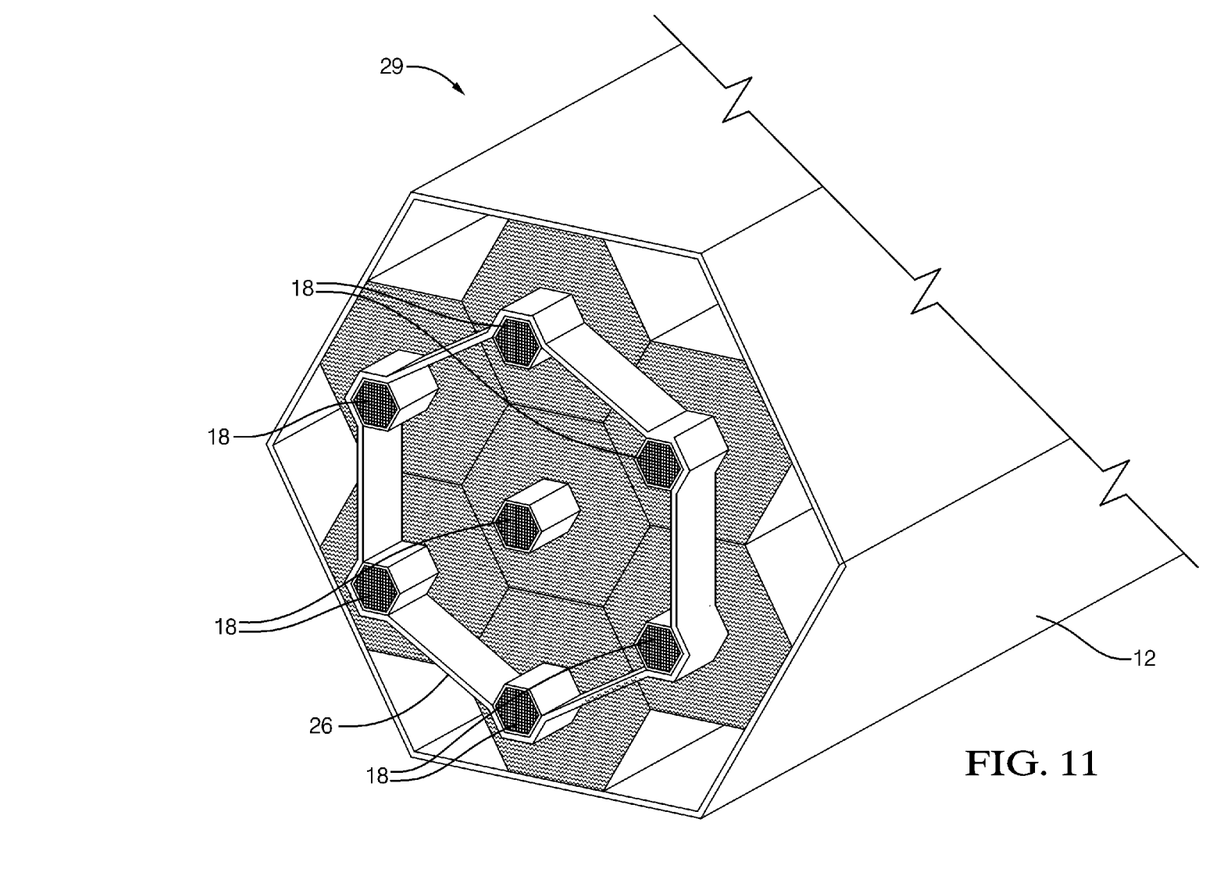
FIG. 11 depicts a perspective view of the structure of FIG. 10.

Turning now to FIGS. 10 and 11, the multi-tube assembly 27 (FIGS. 7-9) is disposed in housing 12, which in this exemplary embodiment is hexagonal shaped in order to accommodate the generally hexagonal shape of multi-tube assembly 27, thereby forming the heat exchange reactor assembly 29. Housing 12 is generally enclosed around the multi-tube reactor assembly, and is shown as such in FIG. 11 with an opening on each end of the housing 12, through which the ends of reactor tubes 18 protrude. FIG. 10 is shown in a cut-away view with the end of housing 12 not shown so that the manner in which the multi-tube assembly 27 (FIGS. 7-9) fits into housing 12 can be illustrated. Heat transfer fluid (e.g., air or any known organic heat transfer fluid) to heat or cool the reactor tubes 18 as necessitated by the desired reaction conditions is directed through the open end of the housing 12 and through the matrix formed by reactor foils 14 (FIG. 6) to transfer heat into or out of the reactor tubes 18. Reactants may be introduced into and reaction product may be collected from the reactor tubes 18 through manifolds (not shown) on each end of the assembly 29, which manifold may be integrated with the collar 26.

In one or more exemplary embodiments, reactor tubes can be engineered in a multi-tube reactor configuration to promote highly uniform fluid flow rates among the tubes, and also for uniform fluid flow rates outside the tubes across the heat exchanger fins or foils. If the incoming gas(es) has/have velocity gradients, the local flow impedance can be increased or decreased by one or more of the following techniques: changing the cell shape, changing the cell density, changing the wall thickness of the substrate, changing the foil thickness. This may be advantageous for catalytic chemical reaction such as the reforming of hydrocarbon fuel, as it allows the reaction to proceed in a uniform and controllable manner.

The tessellated pattern shown in FIGS. 7-10 is based on hexagons, like a honeycomb. This pattern, often found in both nature and industrial design, may offer advantages in structural integrity, ease of fabrication, and is readily formed into a regular tessellated pattern using uniform hexagonal shapes. However, other shapes such as triangles, squares, or rectangles, may also be formed into regular tessellated patterns using uniform shapes, and are also available as exemplary embodiments of the invention. Other combinations of regular polygons may also be tessellated, such as octagons with squares (also known as truncated square tiling), squares with triangles (such as snub square tiling or elongated triangular tiling), hexagons with triangles (such as snub hexagonal tiling, snub hexagonal tiling reflection, or trihexagonal tiling), dodecagons with triangles (also known as truncated hexagonal tiling), or dodecagons with squares and hexagons (also known as truncated trihexagonal tiling). Exemplary embodiments of the invention include these, as well as numerous other tessellated patterns known in the art, as described for example by D. Chavey, "Tilings by Regular Polygons-II: A Catalog of Tilings", *Computers & Mathematics with Applications* 17: 147-165 (1989), the disclosure of which is incorporated by reference in its entirety. Irregular tessellated patterns and semi-regular tessellated patterns are also well-known, and are included as exemplary embodiments of the invention.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A chemical reactor comprising:
   a plurality of tubes comprising a catalytic reactor substrate therein, each of said tubes having an inlet at one end for receiving a fluid flow and an outlet at an opposing end for discharging fluid flow, and a longitudinal axis parallel to the direction of fluid flow through the tube, the longitudinal axis of each tube being parallel to one another; and
   at least one heat transfer foil wounded about each one of said tubes forming heat exchange fins;
   the heat exchange fins on each tube independently having a profile along a cross-section perpendicular to the longitudinal axis of said each tube, and the tubes being arranged with respect to one another, such that the heat exchange fin profiles together form a tessellated pattern in a plane that is perpendicular to the longitudinal axes of the tubes.

2. A chemical reactor according to claim 1 wherein each tube has a first end portion that is free from heat exchange fins, a middle portion having said heat exchange fins, and a second end portion that is free from heat exchange fins.

3. A chemical reactor according to claim 2, further comprising a collar affixed to two or more of said tubes on the first end portion thereof.

4. A chemical reactor according to claim 3, further comprising a collar affixed to two or more of said tubes on the second end portion thereof.

5. A chemical reactor according to claim 1, further comprising an enclosed housing disposed around said plurality of tubes such that with each end of said plurality of tubes protruding from the housing, said housing including an inlet and an outlet for a fluid to transfer heat to or receive heat from said tubes.

6. A chemical reactor according to claim 1, wherein the heat exchange fins are affixed to said tubes by brazing.

7. A chemical reactor according to claim 1 for catalytic reforming of vaporized diesel fuel.

8. A chemical reactor according to claim 1 wherein shape of the profile of each tube along a cross-section perpendicular to the longitudinal axis of said each tube is substantially the same as the shape of the profile of the heat exchange fins on said tube.

* * * * *